United States Patent
Wang

(10) Patent No.: US 10,420,357 B2
(45) Date of Patent: Sep. 24, 2019

(54) METHOD FOR PREPARING INSTANT NOODLE, FLOUR COMPOSITION FOR INSTANT NOODLE AND USE THEREOF

(71) Applicant: Standard Foods Corporation, Taipei (TW)

(72) Inventor: Shing-Jung Wang, Taipei (TW)

(73) Assignee: Standard Foods Corporation, Taipei (TW)

( * ) Notice: Subject to any disclaimer, the term of this patent is extended or adjusted under 35 U.S.C. 154(b) by 0 days.

(21) Appl. No.: 14/609,625

(22) Filed: Jan. 30, 2015

(65) Prior Publication Data

US 2016/0007617 A1 Jan. 14, 2016

Related U.S. Application Data

(60) Provisional application No. 62/022,675, filed on Jul. 10, 2014.

(51) Int. Cl.
*A23L 7/113* (2016.01)
*A23L 29/212* (2016.01)
*A23L 7/10* (2016.01)

(52) U.S. Cl.
CPC .............. *A23L 7/113* (2016.08); *A23L 7/197* (2016.08); *A23L 29/212* (2016.08)

(58) Field of Classification Search
USPC ....................................................... 426/557
See application file for complete search history.

(56) References Cited

U.S. PATENT DOCUMENTS

| | | | | |
|---|---|---|---|---|
| 3,930,027 A | * | 12/1975 | Kelly | A23L 7/107 426/28 |
| 5,786,018 A | * | 7/1998 | Toh | A23L 1/16 426/451 |
| 6,156,365 A | * | 12/2000 | Liwszyc | A21D 2/36 426/462 |
| 7,316,827 B2 | | 1/2008 | Wang | |
| 2004/0105929 A1 | * | 6/2004 | Tomoda | A23L 7/111 426/557 |
| 2004/0175478 A1 | | 9/2004 | Wang | |
| 2006/0198933 A1 | * | 9/2006 | Sadakiyo | A21D 13/04 426/506 |
| 2006/0251792 A1 | * | 11/2006 | Shariff | A21D 6/003 426/622 |
| 2010/0112167 A1 | | 5/2010 | Chatel et al. | |
| 2011/0281007 A1 | * | 11/2011 | Chatel | A21D 2/186 426/541 |
| 2016/0120192 A1 | * | 5/2016 | Duncanson | A23L 33/00 426/2 |

FOREIGN PATENT DOCUMENTS

| | | |
|---|---|---|
| CL | 184994 | 9/1994 |
| CL | 40132 | 4/1996 |
| CL | 41424 | 4/1996 |
| CL | 41285 | 10/1996 |
| CL | 01718 | 6/2012 |
| CN | 1060767 A | 5/1992 |
| CN | 101444276 | 6/2009 |
| CN | 101836709 A | 9/2010 |
| CN | 102132829 | 7/2011 |
| CN | 102246922 A | 11/2011 |
| CN | 102669552 | 9/2012 |
| CN | 103169008 | 6/2013 |
| EP | 0738473 A2 | 10/1996 |
| JP | H05-137527 | 6/1993 |
| JP | H06-046781 | 2/1994 |
| JP | 08-289750 | 11/1996 |
| JP | 10-108638 | 4/1998 |
| JP | 11-276105 A | 10/1999 |
| JP | 2005013216 A | 1/2005 |
| JP | 2007-159546 A | 6/2007 |
| KR | 1020040079813 A | 9/2004 |
| KR | 100719964 B1 | 5/2007 |
| KR | 1020090044604 | 5/2009 |
| KR | 20090089260 A | 8/2009 |
| KR | 20100046711 A | 5/2010 |
| KR | 1020130105131 | 9/2013 |
| NZ | 531578 | 4/2006 |
| TW | 419357 B | 1/2001 |
| TW | 200421987 | 11/2004 |
| TW | I249378 B | 2/2006 |

(Continued)

OTHER PUBLICATIONS

Dave Johnson, "Drum Drying—What is it?", Jul. 14, 2012.*
How to Make Chewy Homemade Udon Noodles-SheSimmers, http://shesimmers.com/2009/07/how-to-make-chewyhomemade-udon-noodles.html , Jul. 2009, 16 pages.
Ivan Ramen's Toasted Rye Noodles—WNYC, http://www.wnyc.org/story/ivan-ramens-toasted-rye-noodles/, Dec. 6, 2013, 3 pages.
Shellenberger, J. A., "Production and Utilization of Wheat", *Wheat Chemistry and Technology, American Association of Cereal Chemists*, St. Paul, Minnesota, XP055205673, Dec. 31, 1964, p. 1-18, p. 9; table IV.

(Continued)

*Primary Examiner* — Lien T Tran

(57) ABSTRACT

A method for preparing an instant noodle, a flour composition for an instant noodle, and an instant noodle are disclosed. The method for preparing the instant noodle includes preprocessing a non-wheat cereal to form processed non-wheat cereal flour. The method further includes providing a non-wheat cereal component having the processed non-wheat cereal flour, and mixing the non-wheat cereal component with a wheat component to form a flour composition. The amount of the non-wheat cereal component is at least 50 weight percent of the total weight of the flour composition, and the amount of the wheat component is 7.5-50 weight percent of the total weight of the flour composition. The flour composition is then formed into the instant noodle.

7 Claims, No Drawings

(56) References Cited

FOREIGN PATENT DOCUMENTS

TW 201026235 A 7/2010
WO WO-2012/029486 A1 3/2012

OTHER PUBLICATIONS

Tjahjadi, C. et al., "Isolation and Characterization of Adzuki Bean (Vigna Angularis CV Takara ) Proteins", *Journal of food science, Wiley-blackwell publishing, INC, US*, vol. 53, No. 5, XP000000645, ISSN : 0022-1147,DOI : 10.1111/J.1365-2621.1988.TB09294. X*table 1*, Sep. 1, 1988, pp. 1438-1443.
Moreno, Yolanda Salinas et al. "Amylose:Amylopectin Ratio in Starch of Nixtamalized Maize Flour and Its Relationship With Tortilla Quality", Rev. Fitotec. Mex. vol. 26 (2): 115-121, 2003.
Lu, Ying-Guo, et al., "Production and Properties of Pre-Gelatinazed Starch and It's Application in Food Industry", Oil and Food, vol. 7, Jul. 2012, pp. 47-49.
Oda, Monta, "The Book of Noodles", Shokuhin Sangyo Shimbunsha, First Version, Sep. 25, 1980, 9 pages.

\* cited by examiner

METHOD FOR PREPARING INSTANT NOODLE, FLOUR COMPOSITION FOR INSTANT NOODLE AND USE THEREOF

CROSS-REFERENCE TO RELATED APPLICATIONS

This application claims priority to U.S. Provisional Patent Application No. 62/022,675, filed Jul. 10, 2014, which is herein incorporated by reference in its entirety.

TECHNICAL FIELD

The present invention is directed to methods for preparing an instant noodle, flour compositions for instant noodles and uses thereof. More particularly, the present invention is directed to methods for preparing an instant noodle having a non-wheat cereal, and flour compositions having a non-wheat cereal for the instant noodle and use thereof.

BACKGROUND

Commercially available cereal noodles contain non-wheat cereal, such as oat, buckwheat, barley, pearl barley, rice, brown rice. However, it is difficult to form a matrix or net-like structure when making dough from non-wheat cereal. Cereal noodles with large amounts of non-wheat cereal do not have the good mouthfeel and texture that is preferred by customers. As a result, the amount of non-wheat cereal in commercially available cereal noodles has to be controlled and may be present in only minor amounts.

The cereal noodles may be formed into instant noodles, and most of the commercially available instant noodles are fried instant noodles. In general, the fried instant noodles are formed by frying cooked noodles in 140-160° C. oil. By being instantly heated to a high temperature, the water content of the noodles is decreased, and holes are produced in the noodles. Therefore, the resulting fried instant noodles can be softened and edible after being soaked in boiling water for about 3 minutes. The fried instant noodles have the aroma of frying, and are loved by the public. However, fried instant noodles contain a large amount of saturated fatty acids, because the fried instant noodles have an oil content that is usually about 20%, thereby making the fried instant noodles high-calorie and potentially harmful to cardiovascular health.

Since the consciousness of people in health has improved, non-fried instant noodles that have advantages of being low fat and low-calorie are getting more and more attention. The non-fried instant noodle has more water content, but also has about a quarter of the oil content of the fried instant noodle. The water-recovery capacity of the non-fried noodle is generally poor in comparison to the fried instant noodle because more holes are produced in the fried noodle during oil frying than those are produced in the non-fried instant noodle, which is typically dried by hot air drying. Therefore, the time required by the fried instant noodle for soaking in boiling water is shorter than that of the non-fried instant noodle.

The soaking time of the non-fried instant noodle may be reduced by improving the drying process of the non-fried instant noodle. For instance, microwave drying can decrease the water content of the noodle to about 10%. Besides improving the drying process, a large amount of chemically modified starch may be added to the dough of the non-fried noodle to reduce the soaking time. Because of the water absorption property of the chemically modified starch, a noodle containing chemically modified starch can absorb water quickly and be softened after soaking in boiling water to make the non-fried instant noodle recover in shorter time in order to be edible. However, this method has two disadvantages:

1. The instant noodle has to be formed by using chemically modified starch, which is not natural; and
2. The chemically modified starch has to be added in a greater quantity to improve water-recovery capacity, which inevitably compresses the amount of the non-wheat cereal in the instant noodle, and thus the amount of the non-wheat cereal cannot be improved.

Moreover, the compressed amount of the non-wheat cereal in the instant noodle due to the addition of the chemically modified starch makes the daily consumption of the cereal instant noodle increase to ingest enough amount of the non-wheat cereal, and thus the non-wheat cereal instant noodle loses the health-conscious features of the product. Until now, instant noodles having a large amount of non-wheat cereal have not been developed.

Accordingly, there is a need for a flour composition and method for preparing an instant noodle, which can improve the amount of the non-wheat cereal in the instant noodle, wherein the noodle has a good water-recovery capacity.

SUMMARY

Embodiments of a first aspect of the invention are directed to a method for preparing an instant noodle, including preprocessing a non-wheat cereal to form processed non-wheat cereal flour. In one or more embodiments, the non-wheat cereal includes starch, and the preprocessing includes gelatinizing or dextrinizing the starch and milling into flour. In one or more embodiments, the method further comprises providing a non-wheat cereal component having the processed non-wheat cereal flour. In one or more embodiments, the non-wheat cereal component is mixed with a wheat component to form a flour composition. In one or more embodiments, the amount of the non-wheat cereal component is at least 50 weight percent of the total weight of the flour composition, and the amount of the wheat component is 7.5-50 weight percent of the total weight of the flour composition. The flour composition is then formed into the instant noodle.

According to one or more embodiments of the present invention, the non-wheat cereal component further includes a non-processed non-wheat cereal flour, i.e. a non-wheat cereal flour that has not been preprocessed, wherein the processed non-wheat cereal flour is present in the range of at least 25 weight percent of the total weight of the flour composition.

According to one or more embodiments of the present invention, the non-wheat cereal may be oat, buckwheat, barley, pearl barley, rice, brown rice, Chinese yam, or a combination thereof.

According to one or more embodiments of the present invention, the preprocessing includes mixing and heating the non-wheat cereal with water to form a non-wheat cereal paste. The non-wheat cereal paste is then dried to form a non-wheat cereal flake, and the non-wheat cereal flake is subsequently milled to form the processed non-wheat cereal flour.

According to another embodiment of the present invention, the preprocessing includes puffing the non-wheat cereal to form a puffed non-wheat cereal. The puffed non-wheat cereal is milled to form the processed non-wheat cereal flour.

In one or more embodiments, the method for puffing the non-wheat cereal is performed by extrusion or heat.

According to yet another embodiment of the present invention, the preprocessing includes steaming the non-wheat cereal to form a softened non-wheat cereal. The softened non-wheat cereal is then dried to form a dried non-wheat cereal, and the dried non-wheat cereal is subsequently milled to form the processed non-wheat cereal flour.

According to yet another embodiment of the present invention, the preprocessing includes sterilizing the non-wheat cereal to gelatinize the starch and milling the sterilized non-wheat cereal into a flour.

According to one or more embodiments of the present invention, the wheat component includes crude protein, and the amount of the crude protein is present in the range of 6 to 20 weight percent of the total weight of the flour composition.

According to one or more embodiments of the present invention, the wheat component is wheat flour, wheat gluten flour, or a combination thereof.

According to one or more embodiments of the present invention, the flour composition further includes pure starch. In one or more embodiments, the amount of the pure starch is in the range of 1 to 35 weight percent of the total weight of the flour composition.

According to one or more embodiments of the present invention, the instant noodle is a non-fried instant noodle.

According to one or more embodiments of the present invention, the instant noodle is a Chinese instant noodle or an Italian instant noodle.

Embodiments of a second aspect of the invention are directed to a flour composition for an instant noodle, the instant noodle including a non-wheat cereal component and a wheat component. In one or more embodiments, the non-wheat cereal component includes processed non-wheat cereal flour, wherein the amount of the non-wheat cereal component is at least 50 weight percent of the total weight of the flour composition, and the processed non-wheat cereal flour includes gelatinized or dextrinized starch. In one or more embodiments, the amount of the wheat component is in the range of 7.5 to 50 weight percent of the total weight of the flour composition.

According to one or more embodiments of the present invention, the wheat component includes a crude protein, and the amount of the crude protein is in the range of 6 to 20 weight percent of the total weight of the flour composition.

Embodiments of a third aspect of the invention are directed to an instant noodle formed by one or more embodiments of flour composition described herein.

One or more embodiments of the method for preparing the instant noodle described in the present invention includes preprocessing the non-wheat cereal to gelatinize or dextrinize the starch, and thus change the water-recovery capacity of the non-wheat cereal. Therefore, the instant noodle prepared by one or more embodiments of the method of the present invention has an increased amount of non-wheat cereal while exhibiting good water-recovery capacity.

DETAILED DESCRIPTION

Before describing several exemplary embodiments of the invention, it is to be understood that the invention is not limited to the details of composition, construction or process steps set forth in the following description. The invention is capable of other embodiments and of being practiced or being carried out in various ways. The detailed description provided below is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

According to one aspect of the invention, a method for preparing instant noodles is provided. According to one or more embodiments, non-wheat cereal is preprocessed to gelatinize or dextrinize the starch of the non-wheat cereal, and thus to change the water-recovery capacity of the non-wheat cereal. Therefore, the instant noodle prepared by one or more embodiments of the method of the present invention has an improved amount of the non-wheat cereal and good water-recovery capacity.

With respect to the terms used in this disclosure, the following definitions are provided.

Gelatinization is a process that when starch is heated with water to a specific temperature, the starch granule absorbs water molecules to allow the water molecules entering the starch granule. The structure of the starch granule is thus destroyed, and becomes uniformly translucent. Dextrinization is a process that when starch is heated under a dry or low moisture condition, the starch becomes soluble starch, and then becomes dextrins. The α-D-glucose in the starch is cut during the dextrinization. The longer the heating time is, the more starch molecules break down. After undergoing gelatinization or dextrinization, the structure of the starch is destroyed, and thus absorbs water more easily. Therefore, the processed non-wheat cereal flour including gelatinized or dextrinized starch of the present invention is applied in preparing an instant noodle, which can improve the water-recovery capacity of the instant noodle without using chemically modified starches. The instant noodle of the present invention can restore the texture of the noodle quickly after soaking in boiling water. There is no need to compress the amount of the non-wheat cereal component in the flour composition that forms the instant noodle of the present invention to improve the water-recovery capacity.

The non-wheat cereal of the present invention may include other ingredients besides starch.

The non-wheat cereal of the present invention is oat, buckwheat, barley, pearl barley, rice, brown rice, Chinese yam, or a combination thereof. Each type of non-wheat cereal has different physiological functions, and the type of the non-wheat cereal used can be chosen as per actual requirements. For instance, oat includes β-glucans, which can lower the amount of cholesterol in the blood, and thus may reduce the risk of cardiovascular disease.

The preprocessing of the present invention may include the following methods:

1. The non-wheat cereal is mixed and heated with water to form a non-wheat cereal paste. The non-wheat cereal paste is dried to form a non-wheat cereal flake. Then, the non-wheat cereal flake is milled to form the processed non-wheat cereal flour. The non-wheat cereal paste may be dried by a drum dryer. The starch of the non-wheat cereal is gelatinized during heating with water.

2. The non-wheat cereal with appropriate particle size is puffed and milled to form the processed non-wheat cereal flour. The non-wheat cereal is puffed by extrusion or heat. The non-wheat cereal may be puffed by heat by use of a puffing gun or a puffing machine. Puffing is a processing method whereby the material is heated and under high pressure. When the pressure is suddenly reduced, the volume of the material increases many times in comparison to its original size. If heat and pressure are removed suddenly when materials having starch is under the heat and pressure, the materials expand rapidly. The high temperature during puffing and the shear force during milling may cause starch dextrinization.

3. The non-wheat cereal is steamed to soften the non-wheat cereal and then dried. The softened, dried non-wheat cereal is milled to form the processed non-wheat cereal flour. The starch of the non-wheat cereal is gelatinized during steaming.

4. The non-wheat cereal is sterilized to gelatinize the starch of the non-wheat cereal. The sterilized non-wheat cereal is dried and milled into flour.

It is noteworthy that besides gelatinizing or dextrinizing the starch and milling, the preprocessing of the present invention may include other steps.

In one or more embodiments, the amount of the wheat component is in the range of 7.5 to 50 weight percent (wt %) of the total weight of the flour composition. In one or more embodiments, the wheat component includes crude protein, and the amount of the crude protein is in the range of 6 to 20 wt % of the total weight of the flour composition. The wheat component of the present invention may be wheat flour, wheat gluten flour, or a combination thereof. When the wheat component includes both wheat flour and wheat gluten flour, there is no particular limitation in the ratio therebetween, only the total amount of the wheat flour and wheat gluten flour has to be in the range of 7.5 to 50 wt %, of the total weight of the flour composition and the amount of the crude protein in the wheat flour and wheat gluten flour has to be in the range of 6 to 20 wt % of the total weight of the flour composition. For instance, if wheat flour includes 16 wt % crude protein, and if wheat gluten flour includes 80 wt % crude protein, the following formulas are utilized to determine the amount of the wheat flour (x wt %) and the amount of the wheat gluten flour (y wt %):

$x+y$=the amount of the wheat component, which is 7.5-50 (wt %); and $0.16x+0.8y$=the amount of the crude protein, which is 6-20 (wt %).

Further, if the entire wheat component is wheat gluten flour, the amount of the wheat component is 7.5 wt % in the flour composition for achieving 6 wt % crude protein in the flour composition.

The crude protein in the flour composition provides a matrix or net-like structure during the production of dough, and the amount of the crude protein can determine the texture of the instant noodle formed. When the amount of the crude protein is lower than 6 wt %, the noodle obtained exhibits unacceptably soft mouthfeel and low elasticity. When the amount of the crude protein is higher than 20 wt %, the noodle obtained exhibits an unacceptable hard mouthfeel.

Current technology uses crude protein in a wheat component to provide noodles with an adequate texture, and improve the amount of oat flour in a dry flour composition at the same time. The wheat component provides the crude protein in an amount in the range of 6-20 wt % of the total weight of the dry flour composition. Moreover, the amount of the non-wheat cereal component has to be at least 50 wt % of the total weight of the dry flour composition. After forming dough from the dry flour composition, the dough is extruded to form Italian noodles, or calendered to form Chinese noodles. The present invention applies processed non-wheat cereal flour to partially or completely replace the oat flour in the dry flour composition. The processed non-wheat cereal flour includes gelatinized or dextrinized starch that provides good water-recovery capacity, and thus the flour composition of the present invention can be used in preparing instant noodles having good water-recovery capacity.

The non-wheat cereal component of the present invention may include the processed non-wheat cereal flour and non-wheat cereal flour without the preprocessing. In this embodiment, the amount of the processed non-wheat cereal flour is at least 25 wt % of the total weight of the flour composition to provide the water-recovery capacity required by the instant noodle.

The flour composition of the present invention may further include pure starch, however, the amount of the crude protein has to be in the range of 6-20 wt %, and the amount of the non-wheat cereal component has to be at least 50 wt % of the total weight of the flour composition. In some embodiments, the pure starch is corn starch, potato starch, rice starch, wheat starch, tapioca starch, or a combination thereof.

The step of forming the flour composition into the instant noodle may include a noodle-making process, a cooking process, and a drying process.

The noodle-making process, which forms noodles from the flour composition, includes calendering or extruding, which can be modified in accordance to the required type of the instant noodle.

The drying process, which dries the noodles to form the instant noodle, may include hot air drying, microwave drying, or a combination thereof, preferably hot air drying.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

Example 1: Preprocessing Non-Wheat Cereal

In one or more embodiments of the present invention having oat as the non-wheat cereal, the non-wheat cereal may be preprocessed by three different methods, including:

1. Extruding puffing: Oat granules were placed in an inlet of an extruder, and drawn through a die by a screw to puff the oat. Then, the puffed oat was milled into flour, which 100% of the flour passes through a 40-mesh sieve. The operating conditions of the extruder (Seng Din Industrial Co., Ltd.; Maximum capacity: 60 kg/hr; Screw length: 230 mm; and Screw diameter: 75 mm) may be:

A. Material: Unmoisturized oat granules (Water content: 10%)
      Operating factors: Feed rate: 40 kg/hr; Screw speed: 200 rpm; Die temperature: 165° C., and Outlet die diameter: 1 mm.

B. Material: Moisturized oat granules (10 kg oat granules+1500 cc water; Water content: 22%)
      Operating factors: Feed rate: 40 kg/hr; Screw speed: 200 rpm; Die temperature: 125° C., and Outlet die diameter: 1 mm.

C. Material: Moisturized oat granules (10 kg oat granules+1500 cc water; Water content: 22%)
Operating factors: Feed rate: 40 kg/hr; Screw speed: 200 rpm; Die temperature: 145° C., and Outlet die diameter: 1 mm.
It was found that oat granules preprocessed under the operating conditions of C have the best water-recovery capacity among three different operating conditions A, B, and C.

2. Drum drying: Oat flour was mixed with water to form oat paste. The oat paste was dried by a drum dryer to form an oat flake. Then, the dried oat flake was milled into flour, which 100% of the flour passes through a 40-mesh sieve. The operating conditions of the drum dryer were as follows:
Material: 5 kg oat flour+15 kg water
Operating factor: 6 kg steam 3. Steaming: Oat was steamed by 100° C. steam for 6-10 minutes, and then cooled by fan to an ambient temperature. The steamed oat was milled into flour, which 100% of the flour passes through a 40-mesh sieve. The steaming time may be adjusted in accordance to actual requirements.

Example 2: Forming the Flour Composition and Instant Noodle

The abovementioned processed oat flour was mixed with other ingredients to form flour composition, which the weight percent (wt %) of each ingredient in the flour composition is shown in the following Table 1 to Table 9, and the flour composition was formed into fresh noodles by a Chinese noodle-making process or an Italian noodle-making process. Then, the fresh noodles were cooked and dried to reduce the water content of the noodles to about 10%, and the instant noodles were obtained.

The wheat component of the embodiments was a mixture of wheat flour and wheat gluten flour.

The method for preparing Chinese instant noodles and Italian instant noodles of the embodiments were:

1. Chinese instant noodles:
    A. The flour composition was formed into dough and stirred for 10 minutes. The dough was aged for 10-30 minutes.
    B. The aged dough was calendered repeatedly by a calendering machine until the aged dough was formed into a smooth noodle sheet having a thickness of about 0.7 mm. The noodle sheet was cut into strands of noodles, and Chinese fresh noodles were thus obtained.
    C. The Chinese fresh noodles were cooked by steam, and then cooled and dried to form Chinese instant noodles having non-wheat cereal. The dried Chinese instant noodles had a thickness of about 0.6 mm and a width of about 1.2 mm.
        The noodle-making machine used to form Chinese fresh noodles includes a raw material mixing unit, a dough sheeting unit, a two sheets combining unit, a calendering unit, a cutting unit, and a steaming unit, and has a maximum productivity of 200 kg/hr.

2. Italian instant noodles:
    A. The flour composition was formed into dough and stirred. Then, the dough was extruded from a pasta die to form Italian fresh noodles having a thickness of about 0.7 mm.
    B. The Italian fresh noodles were cut and cooked by steam. After cooling and drying, Italian instant noodles having non-wheat cereal were formed. The dried Italian instant noodles had a thickness of about 0.6 mm.
        The noodle-making machine used to form Italian fresh noodles is a laboratory pasta machine supplied by La Parmigiana Corp., Italy, which has a maximum productivity of 30 kg/hr.

Hereinafter, the mouthfeel and the texture of the instant noodles prepared by the method of the present invention were analyzed. The analysis methods include:

1. Sensory analysis:
    The Chinese instant noodles and the Italian instant noodles were soaked in 100° C. hot water for different durations and drained. The overall mouthfeel, including chewability, elasticity, were judged by five tasters, and the result was classified into five classes: 1: Poor; 2: Below average; 3: Average; 4: Above average; and 5: Good.

2. Measurement of instrument: Measurements were conducted by a texture analyzer available from Stable Micro Systems Corp.
    Sample preparation: 50 g of the Chinese instant noodles and Italian instant noodles were put in a beaker, 500 mL of boiling water was added into the beaker, and the beaker was covered by a lid. The instant noodles were soaked in the hot water for a period of time (about 3-5 minutes). Then, the noodles were subsequently soaked in cold water and drained, and cooled to an ambient temperature.
    Texture analysis: Five noodle strands were analyzed by the texture analyzer. A probe for detecting the firmness of the noodle strands (Pasta Firmness RIG code HDP/PES) was used to detect the force required to compress the noodle strands. The measurement parameters were:
    Pretest speed: 1.0 m$^2$/s
    Test speed: 0.5 m$^2$/s
    Post test speed: 10.0 m$^2$/s
    Distance: 90%
    The texture, including firmness and stickiness, of the noodle strands of the instant noodles were analyzed under the conditions of the constant speed and pressure. The units of the firmness and the stickiness were represented by g/cm$^2$.

General commercially available instant noodles have a firmness of about 1200-1500 g/cm$^2$ after soaking. The stickiness depends on personal preference, and the optimum stickiness is about 300-500 g/cm$^2$. Moreover, people may have different requirements on the texture of Chinese noodles and Italian noodles. The Chinese noodles having a soft and chewy mouthfeel are most acceptable, while the Italian noodles having an al dente mouthfeel are most acceptable.

Effect of Different Preprocessing on Instant Noodle

The effects of using different methods of preprocessing on the instant noodles formed were discussed in the following embodiments. Embodiments A1-A6 and Embodiments B1-B6 were Chinese and Italian instant noodles respectively, and the ratio of each ingredient in the flour composition and the analysis results of texture and mouthfeel are shown in the following Table 1 and Table 2. The preprocessing method for Embodiments A1, A2, B1, and B2 was extruding puffing; the preprocessing method for Embodiments A3, A4, B3, and B4 was drum drying; and the preprocessing method for Embodiments A5, A6, B5, and B6 was steaming.

TABLE 1

| Embodi-ment | Flour composition | | | Analysis for Chinese noodles | | |
|---|---|---|---|---|---|---|
| | Wheat component (wt %) | Crude protein (wt %) | Processed oat flour (wt %) | Firmness (g/cm$^2$) | Stickiness (g/cm$^2$) | Sensory score |
| A1 | 10 | 8 | 90 | 1311 | 322 | 3 |
| A2 | 15 | 12 | 85 | 1342 | 421 | 3 |
| A3 | 10 | 8 | 90 | 1208 | 423 | 3 |
| A4 | 15 | 12 | 85 | 1341 | 563 | 4 |
| A5 | 10 | 8 | 90 | 1285 | 323 | 3 |
| A6 | 15 | 12 | 85 | 1301 | 408 | 3 |

TABLE 2

| Embodi-ment | Flour composition | | | Analysis for Italian noodles | | |
|---|---|---|---|---|---|---|
| | Wheat component (wt %) | Crude protein (wt %) | Processed oat flour (wt %) | Firmness (g/cm$^2$) | Stickiness (g/cm$^2$) | Sensory score |
| B1 | 10 | 8 | 90 | 1342 | 424 | 3 |
| B2 | 15 | 12 | 85 | 1458 | 435 | 4 |
| B3 | 10 | 8 | 90 | 1358 | 574 | 3 |
| B4 | 15 | 12 | 85 | 1477 | 563 | 4 |
| B5 | 10 | 8 | 90 | 1328 | 438 | 3 |
| B6 | 15 | 12 | 85 | 1423 | 457 | 4 |

Embodiments A1-A6 and Embodiments B1-B6 used three different preprocessing methods to preprocess the oat, and were formed by the above-mentioned method for preparing Chinese and Italian instant noodles respectively. As shown in Table 1 and Table 2, the instant noodles prepared can restore the proper firmness, stickiness, and mouthfeel of the noodle after soaking in boiling water. Particularly, the proper firmness, stickiness, and mouthfeel of Embodiments A3 and A4 were more acceptable by the tasters as Chinese noodles, and the proper firmness, stickiness, and mouthfeel of Embodiments B3 and B4 were more acceptable by the tasters as Italian noodles. In other words, the effect of preprocessing the oat by drum drying was better than the other two preprocessing methods.

Therefore, the following Embodiments A3, A4, A7-A12 and Embodiments B3, B4, B7-B12 used drum drying to preprocess the oat, and were Chinese and Italian instant noodles, respectively. The ratio of each ingredient in the flour composition was changed among embodiments. The analysis results of texture and mouthfeel for Chinese and Italian instant noodles are shown in the following Table 3 and Table 4, respectively.

TABLE 3

| Embodi-ment | Flour composition | | | Analysis for Chinese noodles | | |
|---|---|---|---|---|---|---|
| | Wheat component (wt %) | Crude protein (wt %) | Processed oat flour (wt %) | Firmness (g/cm$^2$) | Stickiness (g/cm$^2$) | Sensory score |
| A3 | 10 | 8 | 90 | 1208 | 423 | 3 |
| A4 | 15 | 12 | 85 | 1341 | 563 | 4 |
| A7 | 20 | 12 | 80 | 1208 | 423 | 4 |
| A8 | 25 | 14 | 75 | 1341 | 563 | 4 |
| A9 | 30 | 14 | 60 | 1285 | 323 | 4 |
| A10 | 35 | 14 | 65 | 1301 | 408 | 4 |
| A11 | 40 | 14 | 60 | 1344 | 425 | 4 |
| A12 | 45 | 14 | 55 | 1357 | 466 | 4 |

TABLE 4

| Embodi-ment | Flour composition | | | Analysis for Italian noodles | | |
|---|---|---|---|---|---|---|
| | Wheat component (wt %) | Crude protein (wt %) | Processed oat flour (wt %) | Firmness (g/cm$^2$) | Stickiness (g/cm$^2$) | Sensory score |
| B3 | 10 | 8 | 90 | 1358 | 574 | 3 |
| B4 | 15 | 12 | 85 | 1477 | 563 | 4 |
| B7 | 20 | 12 | 80 | 1485 | 565 | 4 |
| B8 | 25 | 14 | 75 | 1546 | 563 | 5 |
| B9 | 30 | 14 | 60 | 1574 | 563 | 5 |
| B10 | 35 | 14 | 65 | 1587 | 574 | 5 |
| B11 | 40 | 14 | 60 | 1549 | 525 | 5 |
| B12 | 45 | 14 | 55 | 1546 | 546 | 5 |

As shown in Table 3 and Table 4, in the total weight of the flour composition that forms the instant noodles, the amount of the oat can be 90 wt %. The instant noodles still had the proper firmness, stickiness, and mouthfeel of the noodle after soaking in boiling water. Therefore, the method for preparing the instant noodle of the present invention may form instant noodles having a large amount of non-wheat cereal.

The flour composition of the present invention may further include pure starch. Embodiments A13-A19 and Embodiments B13-B19 applied the same weight percent of wheat component and crude protein as Embodiments A3, A4, A7-A11 and Embodiments B3, B4, B7-B11, and partially replaced the processed oat flour with pure starch. The pure starch used in Embodiments A13-A19 and Embodiments B13-B19 was corn starch. The amount of the processed oat flour was maintained at 55 wt % of the total weight of the flour composition. Embodiments A13-A19 and Embodiments B13-B19 also used drum drying to preprocess the oat. The ratio of each ingredient in the flour composition of Embodiments A12-A19 and Embodiments B12-B19 and the analysis results of texture and mouthfeel for Chinese and Italian instant noodles are shown in the following Table 5 and Table 6, respectively.

TABLE 5

| | Flour composition | | | | Analysis for Chinese noodles | | |
|---|---|---|---|---|---|---|---|
| Embodiment | Wheat component (wt %) | Crude protein (wt %) | Processed oat flour (wt %) | Pure starch (wt %) | Firmness (g/cm$^2$) | Stickiness (g/cm$^2$) | Sensory score |
| A13 | 10 | 8 | 55 | 35 | 1164 | 575 | 3 |
| A14 | 15 | 12 | 55 | 30 | 1198 | 533 | 3 |
| A15 | 20 | 12 | 55 | 25 | 1201 | 501 | 3 |
| A16 | 25 | 14 | 55 | 20 | 1281 | 505 | 4 |
| A17 | 30 | 14 | 55 | 15 | 1285 | 483 | 4 |
| A18 | 35 | 14 | 55 | 10 | 1295 | 468 | 4 |
| A19 | 40 | 14 | 55 | 5 | 1301 | 465 | 4 |
| A12 | 45 | 14 | 55 | 0 | 1357 | 466 | 4 |

TABLE 6

| | Flour composition | | | | Analysis for Italian noodles | | |
|---|---|---|---|---|---|---|---|
| Embodiment | Wheat component (wt %) | Crude protein (wt %) | Processed oat flour (wt %) | Pure starch (wt %) | Firmness (g/cm$^2$) | Stickiness (g/cm$^2$) | Sensory score |
| B13 | 10 | 8 | 55 | 35 | 1264 | 575 | 3 |
| B14 | 15 | 12 | 55 | 30 | 1498 | 523 | 4 |
| B15 | 20 | 12 | 55 | 25 | 1424 | 501 | 4 |
| B16 | 25 | 14 | 55 | 20 | 1531 | 515 | 5 |
| B17 | 30 | 14 | 55 | 15 | 1522 | 498 | 5 |
| B18 | 35 | 14 | 55 | 10 | 1532 | 578 | 5 |
| B19 | 40 | 14 | 55 | 5 | 1511 | 565 | 5 |
| B12 | 45 | 14 | 55 | 0 | 1546 | 546 | 5 |

As shown in Table 5 and Table 6, the processed oat flour may be partially replaced with pure starch, as long as the amount of the oat flour is maintained above 50 wt % of the total weight of the flour composition, and the amount of the crude protein is maintained at 6-20 wt % of the total weight of the flour composition, the formed Chinese and Italian instant noodles may still meet the tasters' requirements for the firmness, stickiness, and mouthfeel after soaking in boiling water.

Other pure starch may be used to partially replace the processed oat flour. The following Embodiments C1-C3 applied the same weight percent of each component in the flour composition as Embodiment A14, but replaced the corn starch with potato starch, tapioca starch, and rice starch, respectively. Embodiments C1-C3 also used drum drying to preprocess the oat. The analysis results of texture and mouthfeel for Chinese instant noodles of Embodiment A14 and Embodiments C1-C3 are shown in the following Table 7.

TABLE 7

| | Flour composition | | | | Analysis for Chinese noodles | | |
|---|---|---|---|---|---|---|---|
| Embodiment | Wheat component (wt %) | Crude protein (wt %) | Processed oat flour (wt %) | Pure starch (wt %) | Firmness (g/cm$^2$) | Stickiness (g/cm$^2$) | Sensory score |
| A14 | 15 | 12 | 55 | Corn starch 30 | 1198 | 533 | 3 |
| C1 | 15 | 12 | 55 | Potato starch 30 | 1147 | 423 | 3 |
| C2 | 15 | 12 | 55 | Tapioca starch 30 | 1201 | 325 | 3 |
| C3 | 15 | 12 | 55 | Rice starch 30 | 1195 | 437 | 3 |

As shown in Table 7, the Chinese instant noodles made from different types of pure starch have similar properties of texture and sensory. Therefore, the type of the pure starch in the flour composition has little effect on the properties of the instant noodles.

The flour composition of the present invention may include both processed oat flour and oat flour that is not preprocessed as the non-wheat cereal component, however the amount of the processed oat flour has to be at least 25 weight percent of the total weight of the flour composition. The following Embodiments A20-A28 and Embodiments B20-28 applied different flour compositions to form Chinese and Italian instant noodles respectively. The ratio of each ingredient in the flour composition and the analysis results of texture and mouthfeel of each embodiment are shown in the following Table 8 and Table 9. The term "unprocessed oat flour" used in the Tables represents the oat flour that has not been preprocessed.

able water-recovery capacity. The following Embodiments D1-D5 and Embodiments E1-E5 applied the same weight percent of each component in the flour composition as used in Embodiment A4 and Embodiment B4, but replaced the oat with buckwheat, barley, pearl barley, brown rice, and Chinese yam, respectively. The preprocessing method for Embodiments D1-D5 and Embodiments E1-E5 was drum drying to preprocess the non-wheat cereal, and the operating conditions of the drum dryer were the same as the aforementioned conditions for preprocessing the oat. Embodiments D1-D5 were Chinese instant noodles, and Embodiments E1-E5 were Italian instant noodles prepared by the above-mentioned methods. The analysis results of texture and mouthfeel of each embodiment are shown in the following Table 10 and Table 11.

TABLE 8

| | Flour composition | | | | Analysis for Chinese noodles | | |
|---|---|---|---|---|---|---|---|
| Embodiment | Wheat component (wt %) | Crude protein (wt %) | Processed oat flour (wt %) | Unprocessed oat flour (wt %) | Firmness (g/cm$^2$) | Stickiness (g/cm$^2$) | Sensory score |
| A20 | 10 | 8  | 55 | 35 | 1135 | 567 | 3 |
| A21 | 15 | 12 | 55 | 30 | 1165 | 538 | 3 |
| A22 | 20 | 12 | 45 | 35 | 1163 | 534 | 3 |
| A23 | 25 | 14 | 40 | 35 | 1204 | 498 | 4 |
| A24 | 30 | 14 | 40 | 30 | 1215 | 504 | 4 |
| A25 | 35 | 14 | 35 | 30 | 1235 | 524 | 4 |
| A26 | 40 | 14 | 35 | 25 | 1246 | 524 | 4 |
| A27 | 45 | 14 | 30 | 25 | 1282 | 517 | 4 |
| A28 | 50 | 14 | 25 | 25 | 1280 | 506 | 4 |

TABLE 9

| | Flour composition | | | | Analysis for Italian noodles | | |
|---|---|---|---|---|---|---|---|
| Embodiment | Wheat component (wt %) | Crude protein (wt %) | Processed oat flour (wt %) | Unprocessed oat flour (wt %) | Firmness (g/cm$^2$) | Stickiness (g/cm$^2$) | Sensory score |
| B20 | 10 | 8  | 55 | 35 | 1168 | 557 | 3 |
| B21 | 15 | 12 | 55 | 30 | 1243 | 543 | 3 |
| B22 | 20 | 12 | 45 | 35 | 1255 | 536 | 3 |
| B23 | 25 | 14 | 40 | 35 | 1295 | 502 | 4 |
| B24 | 30 | 14 | 40 | 30 | 1310 | 498 | 4 |
| B25 | 35 | 14 | 35 | 30 | 1333 | 514 | 5 |
| B26 | 40 | 14 | 35 | 25 | 1345 | 521 | 5 |
| B27 | 45 | 14 | 30 | 25 | 1383 | 522 | 5 |
| B28 | 50 | 14 | 25 | 25 | 1340 | 523 | 5 |

As shown in Table 8 and Table 9, the flour composition of the present invention may includes both processed oat flour and unprocessed oat flour as the non-wheat cereal component, however the amount of the processed oat flour has to be maintained at least 25 wt % of the total weight of the flour composition to provide the Chinese and Italian instant noodles with good water-recovery capacity. The Chinese and Italian instant noodles may still meet the tasters' requirements for the firmness, stickiness, and mouthfeel after soaking in boiling water.

Other processed non-wheat cereal flour may be used in the flour composition to provide instant noodles with accept-

TABLE 10

| | Flour composition | | | Analysis for Chinese noodles | | |
|---|---|---|---|---|---|---|
| Embodiment | Wheat component (wt %) | Crude protein (wt %) | Processed non-wheat flour (wt %) | Firmness (g/cm$^2$) | Stickiness (g/cm$^2$) | Sensory score |
| A4 | 15 | 12 | Oat 85 | 1341 | 563 | 4 |
| D1 | 15 | 12 | Buckwheat 85 | 1235 | 438 | 4 |
| D2 | 15 | 12 | Barley 85 | 1275 | 483 | 4 |
| D3 | 15 | 12 | Pearl barley 85 | 1167 | 357 | 3 |

TABLE 10-continued

| Embodiment | Flour composition | | | Analysis for Processed Chinese noodles | | |
|---|---|---|---|---|---|---|
| | Wheat component (wt %) | Crude protein (wt %) | non-wheat flour (wt %) | Firmness (g/cm$^2$) | Stickiness (g/cm$^2$) | Sensory score |
| D4 | 15 | 12 | Brown rice 85 | 1277 | 353 | 4 |
| D5 | 15 | 12 | Chinese yam 85 | 1204 | 248 | 3 |

TABLE 11

| Embodiment | Flour composition | | | Analysis for Processed Italian noodles | | |
|---|---|---|---|---|---|---|
| | Wheat component (wt %) | Crude protein (wt %) | non-wheat flour (wt %) | Firmness (g/cm$^2$) | Stickiness (g/cm$^2$) | Sensory score |
| B4 | 15 | 12 | Oat 85 | 1477 | 563 | 4 |
| E1 | 15 | 12 | Buckwheat 85 | 1358 | 415 | 4 |
| E2 | 15 | 12 | Barley 85 | 1311 | 474 | 4 |
| E3 | 15 | 12 | Pearl barley 85 | 1277 | 363 | 3 |
| E4 | 15 | 12 | Brown rice 85 | 1341 | 458 | 3 |
| E5 | 15 | 12 | Chinese yam 85 | 1341 | 357 | 4 |

As shown in Table 10 and Table 11, even though the Chinese and Italian instant noodles are made from different types of non-wheat cereal, each type of the processed non-wheat cereal flour may still provide the Chinese and Italian instant noodles with good water-recovery capacity, and meet the tasters' requirements for the firmness, stickiness, and mouthfeel after soaking in boiling water.

Given the above, one or more embodiments of the method for preparing an instant noodle of the present invention can improve the water-recovery capacity of the instant noodle without using chemically modified starches, and enable the instant noodle to recover to be edible in a short period of time. The one or more of the embodiments of the method of the present invention preprocesses the non-wheat cereal to gelatinize or dextrinize the starch, and thus changes the water-recovery capacity of the non-wheat cereal. Therefore, the instant noodle prepared by one or more of the embodiments of the method of the present invention has good water-recovery capacity and improved amount of the non-wheat cereal. The instant noodle prepared by one or more of the embodiments of the method of the present invention can restore the texture of the noodle after being soaked in boiling water for 3-5 minutes. The amount of the non-wheat cereal component in the flour composition that forms the instant noodle can be above 50 wt %.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "an embodiment" in various places throughout this specification are not necessarily referring to the same embodiment of the invention. Furthermore, the particular features, structures, materials, or characteristics may be combined in any suitable manner in one or more embodiments. The order of description of the above method should not be considered limiting, and methods may use the described operations out of order or with omissions or additions.

Although the present invention has been described in considerable detail with reference to certain embodiments thereof, other embodiments are possible. It will be apparent to those skilled in the art that various modifications and variations can be made to the structure of the present invention without departing from the scope or spirit of the invention. Therefore, the spirit and scope of the appended claims should not be limited to the description of the embodiments contained herein. The scope of the invention should be determined with reference to the appended claims, along with the full scope of equivalents to which such claims are entitled.

What is claimed is:

1. A method for preparing an instant noodle comprising:
preprocessing oat to form a preprocessed oat flour, the preprocessing the oat comprising:
mixing oat flour with water to form oat paste;
drum drying the oat paste to form an oat flake; and
milling the oat flake into the preprocessed oat flour;
mixing the preprocessed oat flour with a non-preprocessed oat flour to form an oat component, wherein the non-preprocessed oat flour is not preprocessed according to the preprocessing the oat;
mixing the oat component with a wheat component to form a flour composition without a chemically modified starch, wherein an amount of the preprocessed oat flour is 25 to 55 weight percent of the total weight of the flour composition, an amount of the non-preprocessed oat flour is 25 to 35 weight percent of the total weight of the flour composition, and an amount of the wheat component is 7.5 to 50 weight percent of the total weight of the flour composition; and
forming the flour composition into a non-fried instant noodle;
wherein the preprocessed oat flour is configured to improve water-recovery capacity of the non-fried instant noodle-.

2. The method of claim 1, wherein the oat comprises a starch.

3. The method of claim 2, wherein the step of preprocessing the oat includes gelatinizing the starch.

4. The method of claim 1, wherein the wheat component includes a crude protein in the range of 6 to 20 weight percent of the total weight of the flour composition.

5. The method of claim 1, wherein the flour composition further includes pure starch in an amount that is in the range of 1 to 35 weight percent of the total weight of the flour composition.

6. The method of claim 1, wherein the preprocessed oat flour enable the non-fried instant noodle to recover to be edible after the non-fried instant noodle is soaked in hot water for about 3 to 5 minutes.

7. A flour composition for a non-fried instant noodle comprising:
an oat component including:
a preprocessed oat flour preprocessed by gelatinizing and drum drying; and
a non-preprocessed oat flour that is not preprocessed according to the preprocessing the oat of claim 1, wherein the preprocessed oat flour is configured to improve water-recovery capacity of the non-fried instant noodle; and a wheat component including a crude protein, wherein an amount of the preprocessed oat flour is 25 to 55 weight percent of the total weight of the flour composition, an amount of the non-preprocessed oat flour is 25 to 35 weight percent of the total weight of the flour composition, an amount of the wheat component is in the range of 7.5 to 50 weight percent of the total weight of the flour composition, and an amount of the crude protein is in the range of 6 to 20 weight percent of the total weight of the flour composition.

* * * * *